United States Patent [19]
Hino et al.

[11] Patent Number: 5,724,073
[45] Date of Patent: Mar. 3, 1998

[54] METHOD FOR THE ENTRY OF A GRAPHIC CHARACTER BY SPECIFYING A PARALLELOGRAM WHERE THE CHARACTER IS TO BE DISPLAYED

[75] Inventors: Takashi Hino; Naruto Takasaki, both of Yokohama, Japan

[73] Assignee: Hitachi Software Engineering Co., Ltd., Kanagawa-ken, Japan

[21] Appl. No.: 589,306

[22] Filed: Jan. 22, 1996

Related U.S. Application Data

[63] Continuation of Ser. No. 219,727, Mar. 29, 1994, abandoned.

[30] Foreign Application Priority Data

Mar. 31, 1993 [JP] Japan .................................. 5-097055

[51] Int. Cl.$^6$ .................................................. G06T 11/00
[52] U.S. Cl. ............................................ 345/441; 345/471
[58] Field of Search ............................ 395/141, 167–172

[56] References Cited

U.S. PATENT DOCUMENTS

| | | | |
|---|---|---|---|
| 4,553,214 | 11/1985 | Dettmer ................................... | 395/143 |
| 5,175,811 | 12/1992 | Sone et al. ............................... | 395/150 |
| 5,313,227 | 5/1994 | Aoki et al. ............................... | 395/135 |
| 5,493,639 | 2/1996 | Hirano et al. ............................ | 395/41 |

FOREIGN PATENT DOCUMENTS

| | | |
|---|---|---|
| 4-63432 | 8/1988 | Japan . |

OTHER PUBLICATIONS

Micrografx, Inc., *Designer Learning Guide*, Jan. 1990, pp. 2–63.

Bryan, "SLEd utility slides graphics into word processors as text", *PC Week*, v. 4, n. 37, p. 108(2), Sep. 15, 1987.

Spiller, "Super stamper: the elastic rubber graphics stamp", *Rainbow*, v. 8, n. 3, p. 28(6), Oct. 1988.

Petzold, "Exploring vector fonts with the OS/2 Graphics Programming Interface", *Microsoft Systems Journal*, v. 4, n. 2, p. 1(14), Mar. 1989.

Walter, "IslandWrite, Draw and Paint", *Seybold Report on Desktop Publishing*, v. 5, n. 6, p. 3(13), Feb. 4, 1991.

Petzold, "GDI comes of age", *Microsoft Systems Journal*, v. 7, n. 5, p. 41(13), Sep. 1992.

James, "Drawing on Windows", *Cadcam*, v. 12, n. 3, p. 61(3), Mar. 1993.

Petzold, "What can we do with OS/2 bitmapped fonts", *PC Magazine*, v. 12, n. 4, p. 342(4), Feb. 23, 1993.

*Primary Examiner*—Joseph R. Burwell
*Attorney, Agent, or Firm*—Fay, Sharpe, Beall, Fagan, Minnich & McKee

[57] ABSTRACT

A method for the entry of a graphic character displays a character in a graphic file on a display unit through a graphic processor having a graphic display function, which involves specifying a parallelogram in a space in which the graphic character to be displayed exists and a character code of the graphic character in defining the graphic character; and creating a graphic character data of the graphic character by determining an attribute representing a geometric shape of the graphic character on the basis of the parallelogram and the number of characters of the character code. The arrangement of this method allows the graphic processor to enter graphic characters efficiently in displaying characters on the graphics.

6 Claims, 5 Drawing Sheets

Fig. 2

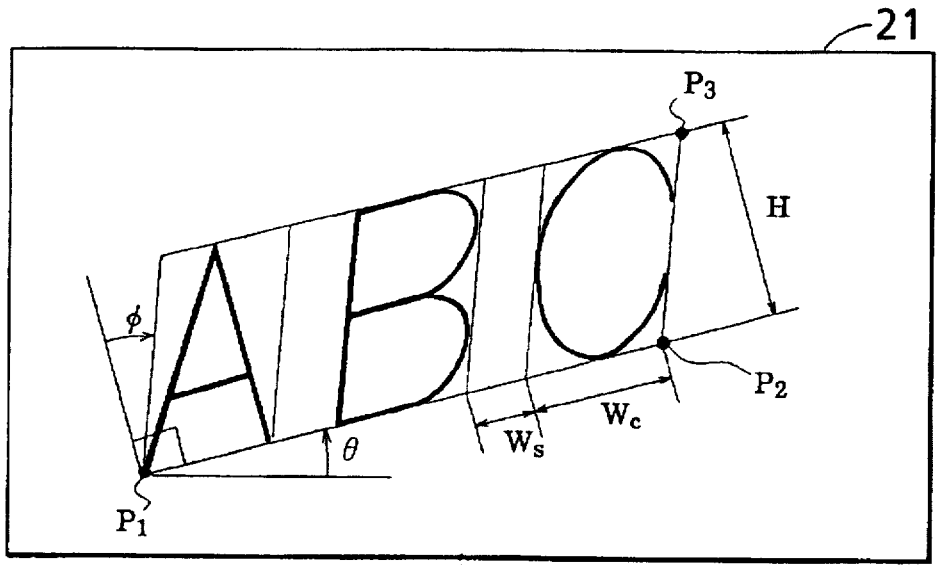

- $W_c$ : CHARACTER WIDTH
- $H$ : CHARACTER HEIGHT
- $\theta$ : ANGLE OF ROTATION OF CHARACTER STRING
- $\phi$ : ANGLE OF INCLINATION OF CHARACTER STRING
- $W_s$ : SPACE BETWEEN CHARACTERS
- $P_1$ : FIRST POINT REPRESENTING REFERENCE POINT OF CHARACTER STRING & GEOMETRIC SHAPE THEREOF
- $P_2$ : SECOND POINT REPRESENTING GEOMETRIC SHAPE OF CHARACTER STRING
- $P_3$ : THIRD POINT REPRESENTING GEOMETRIC SHAPE OF CHARACTER STRING

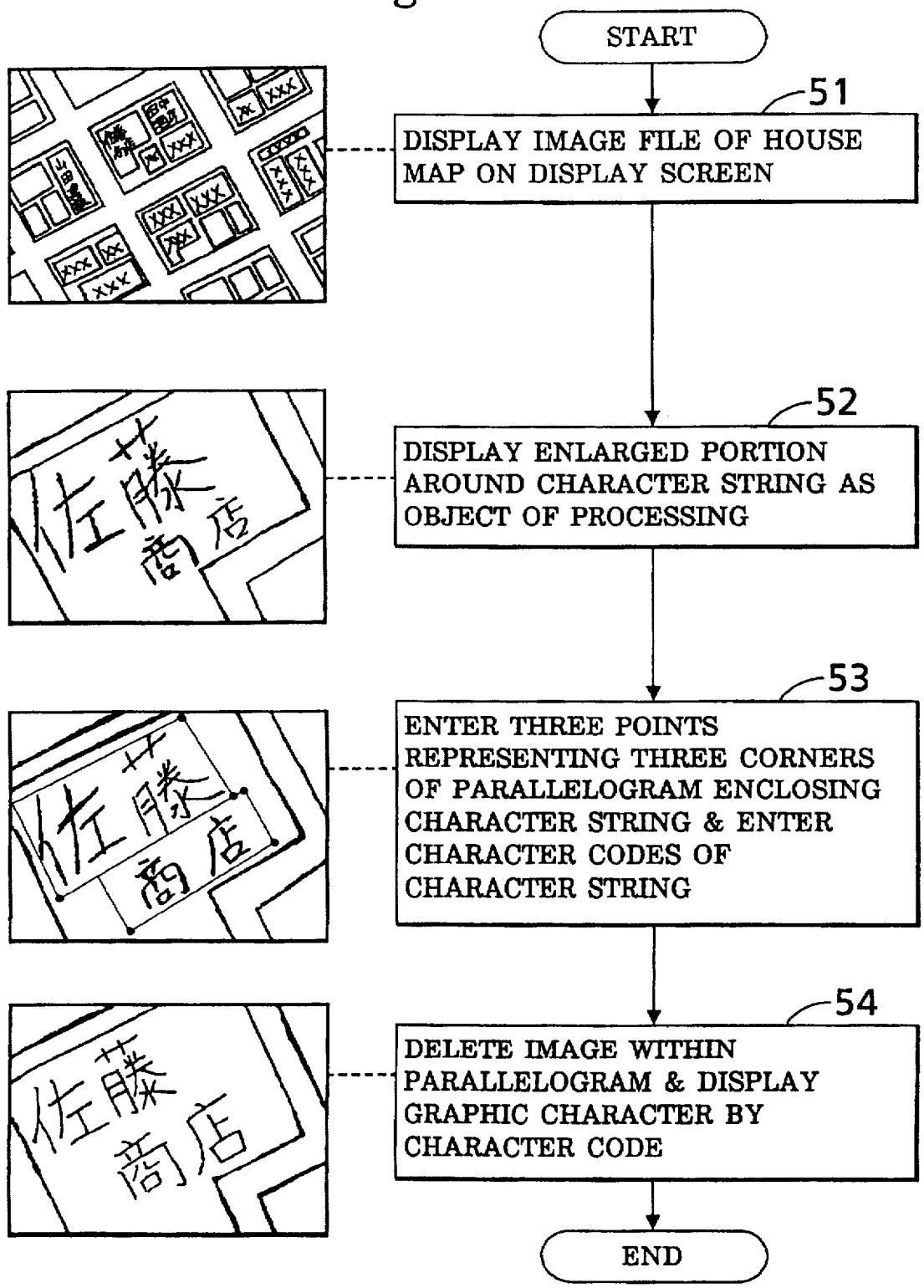

METHOD FOR THE ENTRY OF A GRAPHIC CHARACTER BY SPECIFYING A PARALLELOGRAM WHERE THE CHARACTER IS TO BE DISPLAYED

This is a continuation application of Ser. No. 08/219,727, filed Mar. 29, 1994, now abandoned.

BACKGROUND OF THE INVENTION

The present invention relates to a method for the entry of a graphic character and, more particularly, to a method for the entry of a graphic character so adapted as to efficiently enter graphic characters which cannot be automatically recognized in subjecting, for example, manually drawn maps with graphics combined or admixed with characters (i.e. letters, numbers, or the like), to electronic data processing, due to the fact that the graphic characters overlap with other graphics or that the graphic characters are stained or are visibly unclear for other reasons.

Heretofore, when a graphic data is created for the graphic character to be utilized for displaying a character on a graphic, conventional processor having graphics displaying functions are designed to define the graphic characters by defining the attributes of each of the graphic characters in advance and making reference to the attributes for defining the character sequence.

On the other hand, when graphics such as maps are created, an extremely large number of graphic characters should be entered. In addition, such graphic characters have a variety of different attributes in accordance with their character sizes, angles of inclination of their characters, their reference positions for display, and the like, so that an extraordinarily long period of time is required for entering such a large amount of graphic characters even if their attributes are set in advance.

Further, graphic characters are entered in the graphics on, for example, maps by techniques such as automatic characters recognition. Such techniques, however, cannot be effectively applied when the graphic characters are rendered unclear due to an overlap with graphics on the maps. In order to make such unclear graphic characters visibly distinct when printed out, amendments to the entry of the graphic characters into the graphics are required.

For example, Japanese Patent examined Publication Kokoku No. 4-63,432 (1992) entitled "Method for the Creation of Characters within a Quadrilateral Frame" proposes a technique for creating characters so as to be displayed on the display screen of a display unit with arbitrary character sizes in arbitrary positions. This technique is effective as means for specifying character sizes and positions of the characters to be entered within frames of parallelograms for vouchers and other documents; however, it is not applicable to a character sequence with an angle of rotation or inclination.

Further, this technique can be effectively utilized, for example, for determining the attributes of sizes of the characters to be entered in graphic characters on a voucher form or the like. On the other hand, graphic characters having a number of different attributes, such as character sizes, inclined characters, reference positions for display and the like, are also required for graphic characters for graphics such as maps and nevertheless no technique for readily entering such graphic characters is yet developed.

Therefore, demands have been made to develop techniques that can readily set complex and different attributes of graphic characters and enter a very large number of such graphic characters having a great variety of geometric shapes.

In addition, automatic apparatuses for subjecting maps or graphics, containing a large number of character sequences in various and different forms, to electronic data processing have been developed. For example, automatic apparatuses are developed which can automatically follow linear images of geometric shapes of graphic characters, such as linear segments, on a map. Those automatic apparatuses, however, fail to perform satisfactorily to such an extent that the graphic characters are to be converted correctly into characters when the graphic characters so overlap with graphics or they are so stained that they are visibly unclear. For these reasons, entry of graphic characters onto a map is conducted manually in most cases even today.

SUMMARY OF THE INVENTION

Therefore, the present invention has an object to provide a method for the entry of a graphic character, so adapted as to enter a character sequence of the graphic character with a graphic processor, together with attributes representing its geometric shape, with a simple operation.

In order to achieve the aforesaid object, the present invention consists of a method for the entry of a graphic character in displaying a character in a graphic on a display unit through a graphic processor having a graphic display function, which is characterized by:

specifying a parallelogram in a space in which the graphic character to be displayed exists and a character code of the graphic character in defining the graphic character; and creating a graphic character data by determining an attribute representing a geometric shape of the graphic character on the basis of the parallelogram and the number of characters of the character code.

With the arrangement of the method according to this invention, the attribute representing the geometric shape of the graphic character contains at least one selected from a character height of each character of the graphic character, a character width thereof, a space between characters thereof, an angle of inclination of the character thereof, an angle of rotation of a character sequence, and a reference position of the character sequence.

Further, the parallelogram (i.e. a quadrilateral with a pair of two parallel sides) is set and specified in the space in which the graphic character is represented by specifying two sides of the parallelogram. Specifically, the lower left corner point of the parallelogram is first specified as a reference point of the graphic character to be enclosed by the parallelogram. Thereafter, the lower right corner point of the parallelogram is specified, followed by specifying the upper right corner point thereof. Further, a reference point of the character sequence, serving as a graphic character, and a linear segment or a straight line representing the angle of rotation of the character sequence is specified, thereby setting the attributes representing the geometric shape of the character sequence in a comprehensive way, without specifying its character height, its character width and a space between its characters. This arrangement of the entry method can efficiently enter character sequences serving as graphic characters having various and different geometric shapes as attributes of the graphic characters.

Other objects, features and advantages of the present invention will become apparent in the course of the description of the preferred embodiments, which follows, with reference to the accompanying drawings.

BRIEF DESCRIPTION OF THE DRAWINGS

FIG. 2 is a diagram for describing the geometric shape of a character sequence with information on the attributes of a graphic character.

FIG. 5 is a diagram for describing an example of entering a graphic character in a map representing houses.

DETAILED DESCRIPTION OF THE PREFERRED EMBODIMENTS

The present invention will now be described in more detail by way of examples with reference to the accompanying drawings.

Figure 1:
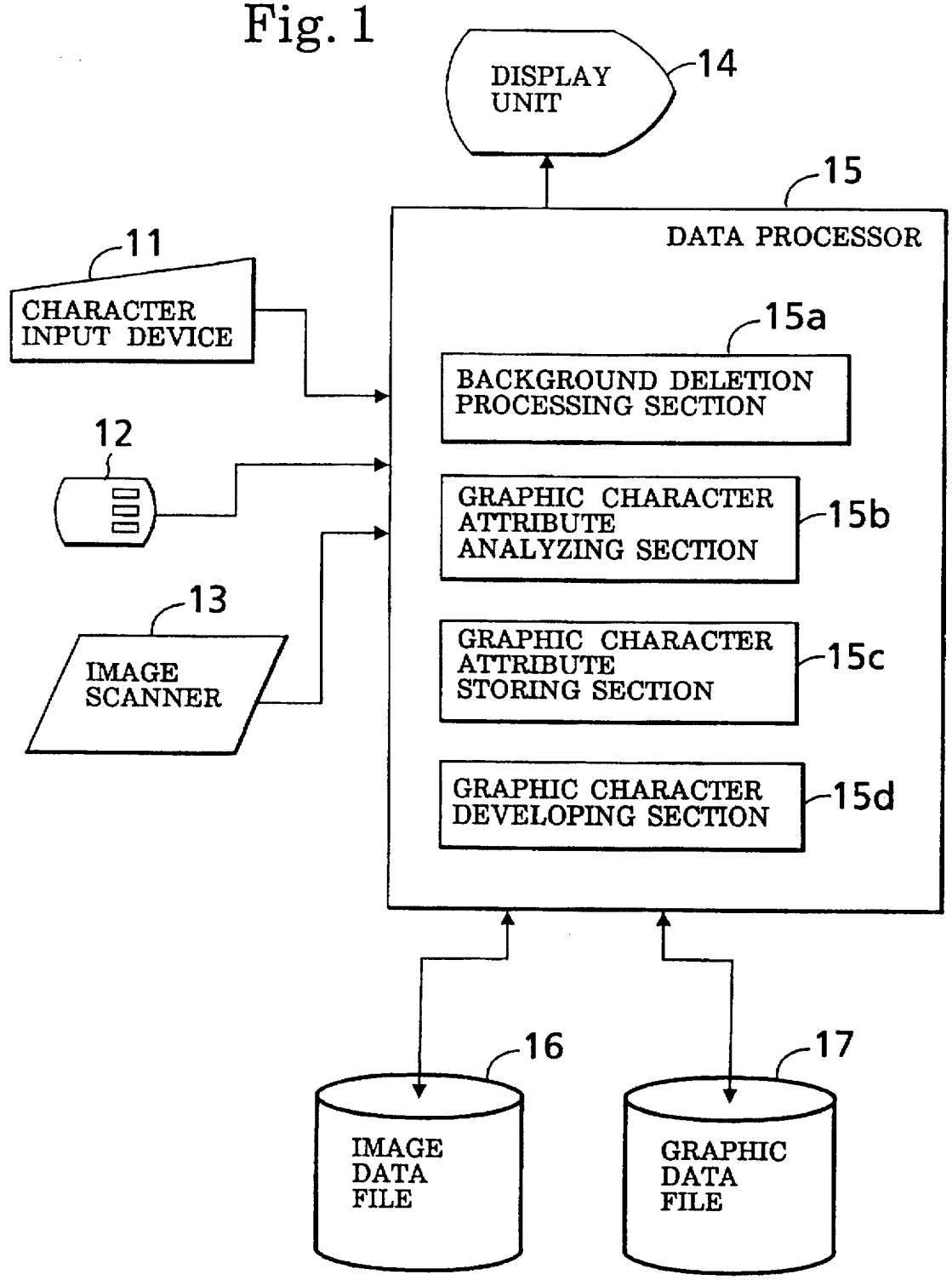
FIG. 1 is a block diagram showing a system configuration of an essential portion of a graphic character processor according to an embodiment of the present invention.

FIG. 1 is a block diagram showing the system configuration of the essential portion of a graphic processor according to an embodiment of the present invention. As shown in FIG. 1, the graphic processor comprises mainly a data processor 15 with a character input device 11, a coordinate input device 12, an image scanner 13, a display unit 14, an image data file 16 and a graphic data file 17.

In the graphic processor, the character input device 11 comprises a keyboard for entering character codes (character code data); the coordinate input device 12 comprises a pointing device such as a digitizer or a mouse, so adapted as to move a cursor on a display screen on the display unit 14 and to enter coordinates of the graphic character; the image scanner 13 is so adapted as to convert graphics such as maps into an image and to enter the image; the display unit 14 is arranged to display images and graphics on its display screen; the data processor 15 is provided with various operating and processing programs and is arranged to have the processing programs started so as to comply with requests for processing and to execute data processing; the image data file 16 is adapted to store the images read from the image scanner 13; and the graphic data file 17 is adapted to store electronically processed linear segments and graphic characters.

In this embodiment of the graphic processor, the data processor 15 includes a background deletion processing section 15a, a graphic character attribute analyzing section 15b, a graphic character attribute storing section 15c, and a graphic character developing section 15d.

Now, an outline of the operations of the graphic processor according to this invention will be described. First, for example, a map as manually drawn is converted by the image scanner 13 into an image data and entered into the data processor 15 and the image data is stored in the image data file 16. The data processor 15 processes the image data with reference to a graphic data, such as an attribute data indicative of a geometric shape of a graphic character and a character sequence, stored in the graphic data file 17, and a graphic is displayed on the display screen of the display unit 14. The coordinate input device 12 including the pointing device, such as the mouse or the digitizer, is used to enter data on coordinate values for graphic processing, and supplied with instructions, for example, for such graphic processing (i.e. instructions for requests for graphic processing through a graphic user interface). The coordinate input device 12 is employed as an interactive input device so adapted as to enter instructions to enter from the operator in an interactive manner, together with output onto the display screen of the display unit 14.

The data processor 15 of the graphic processor with the above-mentioned arrangement executes the processing for the entry of a graphic character stored in the graphic data file 17 by defining the graphic characters on the basis of the coordinate data entered from the coordinate input device 12, the graphic data such as line segments and the like, and the character data (character code data) of the character sequence entered from the character input device 11. The character data of the character sequence is defined and entered into the data processor 15, together with the attributes representing the geometric shape of the character sequence, and it is then stored in the graphic data file 17, for example, as a graphic character data representing a character on the graphic of the map.

The attributes representing the geometric shape of the character sequence to be employed for defining the graphic character are set by computing information on the attributes of the graphic character such as a character width and a character height of each character of the graphic character, an angle of rotation of the character sequence, an angle of inclination of the character sequence, and a space between the characters of the character sequence on the basis of the shape of a parallelogram containing the character sequence and the character data of the character sequence. The shape of the parallelogram containing the character sequence is defined by entering a coordinate data of input points P1, P2 and P3 entered through the coordinate input device 12, in a manner as will be described hereinafter.

When the graphic character is defined for the graphic, the graphic character is processed by the data processor together with the character data prepared from the information on the attributes of the graphic character and the resulting display data is displayed on the display unit 14. The graphic processing for displaying the graphic character on the display unit 14 is executed by the processing elements of the data processor 15, consisting of the background deletion processing section 15a, the graphic character attribute analyzing section 15b, the graphic character attribute storing section 15c, and the graphic character developing section 15d. The information on the attributes of the graphic character is stored with the character data in the graphic data file 17.

FIG. 2 is a diagram for describing the geometric shape of the character sequence with information on the attributes of the graphic character. At an upper side of FIG. 2, the character sequence "ABC" is shown in an inclined state. A graphic character 21 of the character sequence "ABC" can be defined by setting a parallelogram so as to enclose a display region of the character sequence "ABC" and entering the coordinate data of the coordinate values of the three points P1, P2 and P3 representing the three corner points of the parallelogram through the coordinate input device 12 including the pointing device. The parallelogram enclosing the display region of the character sequence "ABC" and representing the geometric shape of the character sequence can be defined by the input points P1, P2 and P3.

The input point P1 represents a data on the coordinates functioning as a reference point for the character sequence. Further, the input point P1 represents a lower left corner point of the geometric shape of the character sequence. The input P2 represents a lower right corner point thereof, and input P3 represents an upper right corner point thereof. The parallelogram can be defined from the input points P1, P2 and P3, and the parallelogram indicates the display region representing the character sequence. The information 22 on the attributes of the graphic character, such as its character width Wc, its character height H, its angle $\theta$ of rotation of the character sequence, its angle $\phi$ of inclination of the character sequence, and its space Ws between the characters of the character sequence can be prepared from the number of the character code data (the number of characters) represented in the display region.

The parallelogram has the relationships as follows:

1. distance between input points P1 and P2=Wc×(number of characters)+Ws×(number of characters−1)
2. angle of line fragment P1P2 relative to horizontal line=θ
3. 90°−(angle between segments P1P2 and P2P3) =φ
4. (distance between input points P2 and P3)×cosφ=H The information 22 on each of the attributes of the graphic character can be prepared from the relationship as described above.

Figure 3:
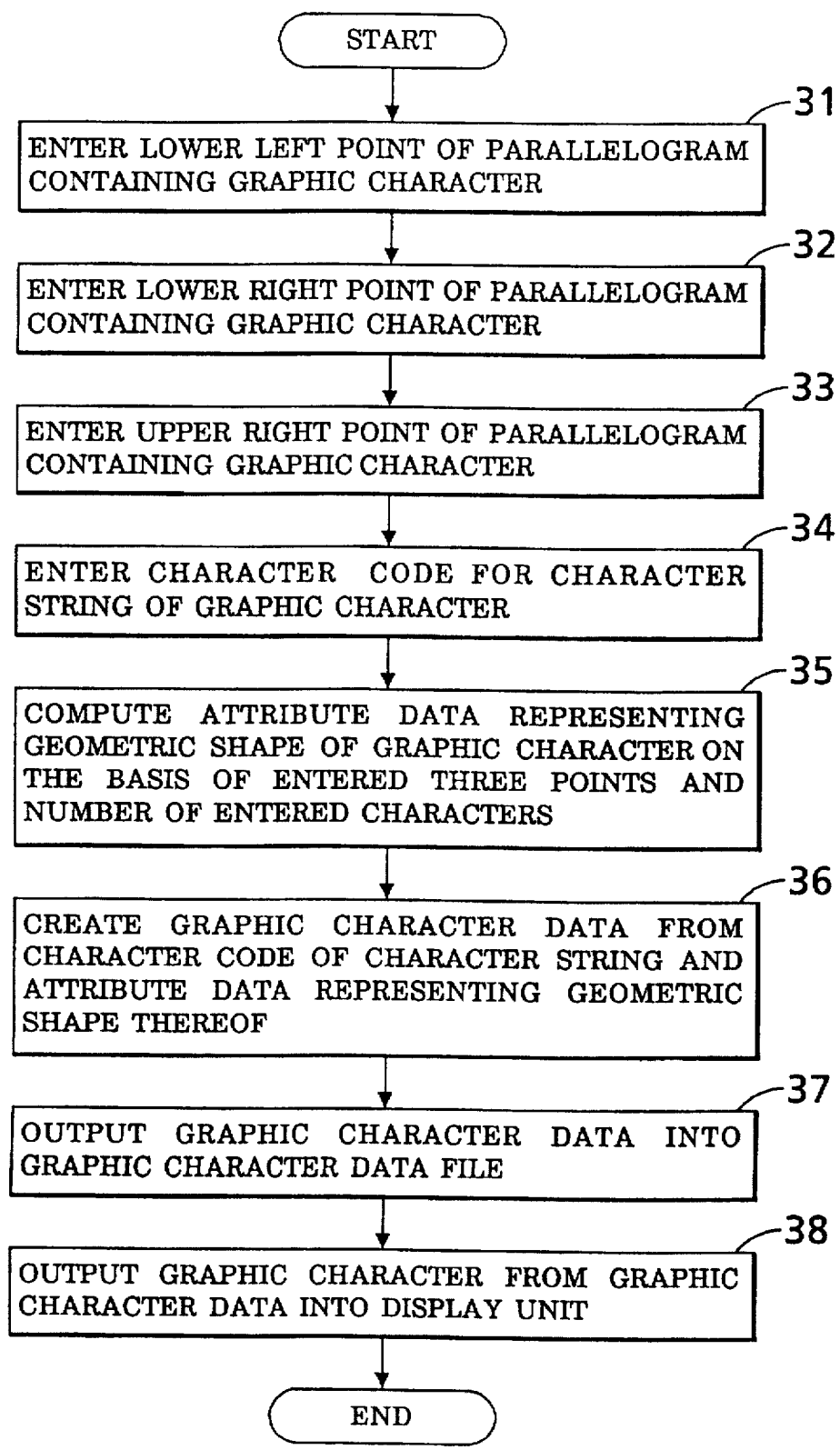
FIG. 3 is a flowchart for describing an example of executing an embodiment of the method for the entry of a graphic character in accordance with this invention.

FIG. 3 is a flowchart for describing an example of executing the method for the entry of the graphic character in accordance with an embodiment of this invention. This example is directed to the processing for the method for the entry of the graphic character to be executed in combination with the input of the attributes of the characters by specifying the three input points.

After the start of the program, the lower left corner point (coordinate data) P1 of the parallelogram containing the graphic character is entered at step 31. Then, at step 32, there is entered the lower right corner point (coordinate data) P2 of the parallelogram, followed by proceeding to step 33 at which the upper right corner point (coordinate data) P3 of the parallelogram is entered. This concludes the input of the three input points for creating the parallelogram. Thereafter, at step 34, the character code of the character sequence for the graphic character is entered.

Then, at step 35, the information on the attributes representing the geometric shape of the graphic character is computed from the entered three input points and the number of the entered characters, followed by proceeding to step 36 at which a graphic character data is created on the basis of the character code of the entered character sequence and the information on the attributes representing the geometric shape of the character sequence. Then, at step 37, the graphic character data is output to the graphic data file 17, followed by step 38 at which the graphic character data is processed and the resulting graphic character is displayed on the display screen of the display unit 14. The processing is terminated after confirmation of the contents of the graphic character created.

Figure 4:
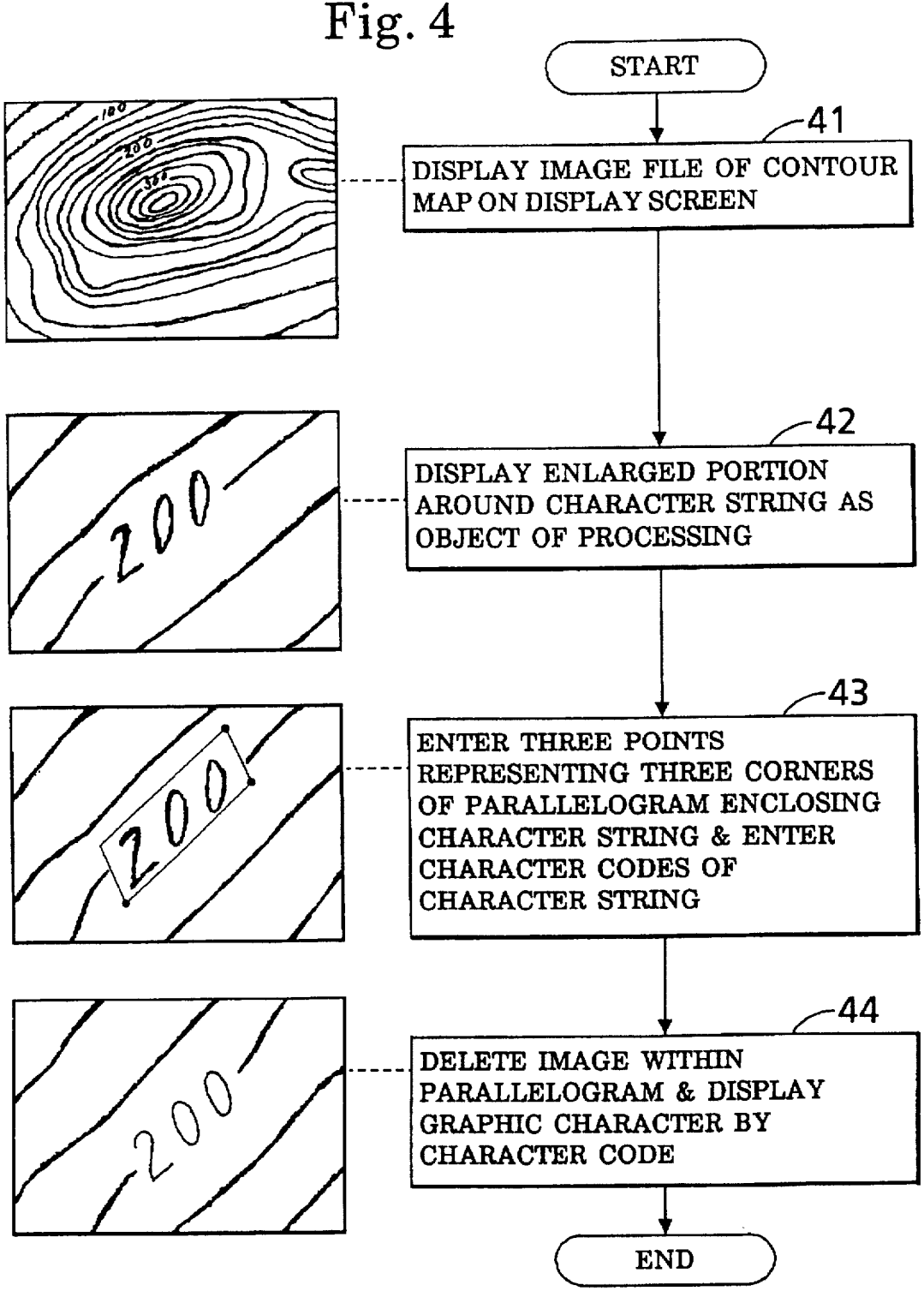
FIG. 4 is a diagram for describing an example of entering a graphic character in a contour map.

A description will now be made of the process for entering a graphic character into a contour map with reference to FIG. 4. In FIG. 4, in which the processing steps are shown on the right side and an example of the display corresponding to each of the processing steps is shown on the left side.

After the start of the program, an image file of a contour map is displayed on the display screen of the display unit at step 41, followed by step 42 at which a portion in the vicinity of a character sequence "200" indicated on a contour line as an object of processing is displayed on an enlarged scale. Then, at step 43, three points representing three corners of a parallelogram enclosing the character sequence "200" are entered, followed by the entry of the character code of the character sequence. Specifically, three points are entered in the same manner as in FIG. 3, by entering a lower left corner point, a lower right corner point and an upper right corner point of the parallelogram consecutively and then the character code representing the character sequence "200" through a keyboard or the like.

Then, at step 44, the image existing within the parallelogram is deleted and the graphic character is displayed therein by its character code on the display screen. This process can delete the characters on the contour line and replace the deleted characters with a clean graphic character represented by the character code. The characters are stored by their character codes in the graphic data file, together with the information on the attributes of its graphic character, and they are displayed on the display screen, as an image of the image file of the contour map is displayed.

In addition, a description will be made of an example of applying the method according to this invention to a map of houses as a different example of the processing for entering the graphic character, with reference to FIG. 5. In FIG. 5, too, processing steps are shown at its right side and an example of display on the display screen corresponding to each of the processing steps is shown at its left side.

After the start of the program, an image file of the map of houses is displayed on the display screen at step 51, followed by displaying a portion around a character sequence "SATO SHOTEN" (written in Chinese characters in this drawing) as an object of processing on an enlarged scale, at step 52. Then, at step 53, three points representing three corners of a parallelogram enclosing the character sequence "SATO SHOTEN" are entered, followed by the entry of the character code of the character sequence. In this case, the three points are entered in areas smaller than the region in which the character sequence is represented, thereby capable of adjusting the size of the character represented as the graphic character. Specifically, three points are entered in the same manner as in FIG. 3, by entering a lower left corner point, a lower right corner point and an upper right corner point of the parallelogram consecutively and then the character code representing the character sequence "SATO" through a keyboard or the like. Thereafter, likewise, there are entered the three points and then the character code representing the character sequence "SHOTEN".

Then, at step 54, the image existing within the parallelogram is deleted and the graphic character is displayed therein by its character code on the display screen. This process can delete the characters on the map of houses and replace the deleted characters with a clean graphic character represented by the character code. The characters by the character code are stored in the graphic data file, together with the information on the attributes of its graphic character, and they are displayed on the display screen, as an image of the image file of the houses map is displayed.

As described hereinabove, the method for the entry of the graphic character in accordance with this invention allows the graphic processor to enter graphic characters with various geometric shapes efficiently. Further, the graphic processor can enter a large number of graphic characters having various geometric shapes efficiently by specifying three points defining a parallelogram containing the graphic character or a graphic, together with a character code, in a space in which the graphic characters are defined with the attributes representing their geometric shapes and with their positions.

What is claimed is:

1. A method of entering a graphic character for display in a graphical image on a display unit by employing a graphic processor having a graphic display function, comprising the steps of:

displaying the contents of an image file, including a portion of said image file into which at least one graphic character is to be entered, said portion being displayed at a displayed scale;

specifying the portion of said image file into which the at least one graphic character is to be entered;

changing the displayed scale of the portion specified in said portion-specifying step;

specifying a parallelogram in which said at least one graphic character is to be entered within said portion;

entering a character code, having a number of characters, representing said at least one graphic character; and creating graphic character data for said at least one graphic character, on the basis of the number of characters of the character code, and on the basis of attribute data representative of a geometric shape of said at least one graphic character;

wherein said attribute data is computed on the basis of the shape of said parallelogram, the displayed scale as changed in said changing step, and the number of characters of the character code.

2. A method as claimed in claim 1, wherein said attribute data includes at least one of a character height of said at least one graphic character, a character width, a space between characters, an angle of inclination of a character, an angle of rotation of a character sequence, and a reference position of the character sequence.

3. A method as claimed in claim 1, wherein said parallelogram is specified by specifying two sides representing said parallelogram.

4. A method as claimed in claim 3, wherein said parallelogram is specified by entering a lower left corner point of said parallelogram as a reference point and then continuing from this reference point and entering two points representing the two sides of said parallelogram in a predetermined manner.

5. A method as claimed in claim 1, wherein said parallelogram is specified so as to overlap with the displayed graphical image.

6. A method for entering a graphic character for display in a graphical image on a display unit by employing a graphic processor having a graphic display function, comprising the steps of:

displaying the contents of an image file, including a portion of said image file into which at least one graphic character is to be entered, said portion being displayed at a displayed scale;

specifying the portion of said image file into which the at least one graphic character is to be entered;

changing the displayed scale of the portion specified in said portion-specifying step;

specifying a parallelogram in which said at least one graphic character is to be entered within said portion;

specifying a reference point of a character sequence of the at least one graphic character to be entered, and one of a linear segment and a straight line representing an angle of rotation of the character sequence;

computing attribute data representing a geometric shape of the character sequence according to the shape of the parallelogram, the angle of rotation of the character sequence, the displayed scale as changed in said changing step, and the number of characters of the character sequence; and creating graphic character data for said at least one graphic character on the basis of the attribute data and the number of characters of the character sequence.

* * * * *